(12) United States Patent
Paxton et al.

(10) Patent No.: US 7,284,505 B1
(45) Date of Patent: Oct. 23, 2007

(54) SKIJOR SYSTEM

(76) Inventors: Stephen E. Paxton, 12324 Little Pine Rd. SW., Brainerd, MN (US) 56401; Lisa M. Lugo-Paxton, 12324 Little Pine Rd. SW., Brainerd, MN (US) 56401

( * ) Notice: Subject to any disclaimer, the term of this patent is extended or adjusted under 35 U.S.C. 154(b) by 47 days.

(21) Appl. No.: 10/980,084

(22) Filed: Nov. 2, 2004

Related U.S. Application Data (60) Provisional application No. 60/517,112, filed on Nov. 3, 2003.

(51) Int. Cl.
*A01K 27/00* (2006.01)
*A44B 18/00* (2006.01)

(52) U.S. Cl. .................... 119/792; 119/856; 24/306

(58) Field of Classification Search ............. 119/770, 119/795, 792, 769, 771, 856, 857, 863, 865; 182/3, 4; 24/306, 442
See application file for complete search history.

(56) References Cited

U.S. PATENT DOCUMENTS

| | | | |
|---|---|---|---|
| 296,764 A | 4/1884 | Marquardt | |
| 794,563 A | 7/1905 | Stahlknecht | |
| 1,641,083 A | 1/1927 | Plantico | |
| 1,800,421 A | 4/1931 | Wickersham et al. | |
| 1,906,043 A | 4/1933 | Bernstein | |
| 2,652,809 A | 9/1953 | Foster | |
| 2,826,172 A | 3/1958 | Buckle et al. | |
| 2,909,154 A * | 10/1959 | Thomas ..................... | 119/771 |
| 3,487,474 A | 1/1970 | De Meo | |
| 3,564,616 A | 2/1971 | Battaglia | |
| 3,804,698 A * | 4/1974 | Kinloch ..................... | 428/176 |
| 3,940,801 A | 3/1976 | Riggs et al. | |
| 3,948,222 A | 4/1976 | Longshore et al. | |
| 4,028,742 A | 6/1977 | Marquis | |
| 4,100,996 A * | 7/1978 | Sharp ........................ | 182/3 |
| 4,411,222 A | 10/1983 | Wolfson | |
| 4,597,359 A | 7/1986 | Moorman | |
| 4,676,198 A | 6/1987 | Murray | |
| 4,715,618 A | 12/1987 | Harris | |
| 4,787,340 A | 11/1988 | Kirtley | |

(Continued)

OTHER PUBLICATIONS

Dowdy, Linda, "Skijoring", HTTP://www.blackicedogsledding.com/page10.html.Sep. 13, 2004, 3 pages.

(Continued)

*Primary Examiner*—Son T. Nguyen
(74) *Attorney, Agent, or Firm*—Albert W. Watkins (57) ABSTRACT

A complete skijor system is illustrated, which includes a novel dog harness, safety tension release, and skijor belt. The system facilitates rapid deployment by requiring only five buckles, while providing exceptional safeguards for dog, skier, and adjacent parties. The harness includes uniquely arranged belly and neck straps which serve the dual function of skijor and car harness. The quick release operates by shear of hook and loop type fasteners, and may use other types of attachment means instead of or in addition to the hook and loop. A manual release is provided which supplements the intrinsic over-tension protection. The skijor belt has novel anti-slip material on an internal surface, and a special holding loop opposed to the lead attachment. The holding loop permits a second person to grab the belt and restrain a skier, such as is useful at the start of a skijor race.

13 Claims, 5 Drawing Sheets

U.S. PATENT DOCUMENTS

| | | |
|---|---|---|
| 4,896,630 A | 1/1990 | Luce |
| 4,903,638 A | 2/1990 | Lacey |
| 4,907,541 A | 3/1990 | Thompson |
| D310,435 S | 9/1990 | Cleveland |
| 4,970,991 A | 11/1990 | Luce |
| 4,993,127 A | 2/1991 | Mechem et al. |
| 5,028,796 A | 7/1991 | Swartz |
| 5,035,203 A | 7/1991 | Cardenas |
| 5,038,719 A | 8/1991 | McDonough |
| 5,052,514 A | 10/1991 | Rezmer |
| 5,081,719 A | 1/1992 | Donnelly |
| 5,136,759 A * | 8/1992 | Armour, II ................. 24/442 |
| 5,152,013 A | 10/1992 | Johnson |
| 5,154,660 A | 10/1992 | Snyder et al. |
| 5,156,644 A | 10/1992 | Koehler et al. |
| 5,167,203 A | 12/1992 | Scott et al. |
| 5,379,928 A | 1/1995 | Mikkelsen |
| 5,411,461 A | 5/1995 | Thomascik |
| 5,427,061 A | 6/1995 | McCullough |
| 5,443,037 A | 8/1995 | Saleme |
| 5,450,820 A | 9/1995 | Kirsch |
| 5,474,329 A | 12/1995 | Wade et al. |
| 5,503,113 A | 4/1996 | Knight |
| 5,511,756 A * | 4/1996 | Spradling ................ 248/316.7 |
| 5,529,018 A | 6/1996 | Butts |
| 5,586,969 A | 12/1996 | Yewer, Jr. |
| 5,758,366 A | 6/1998 | Wilson |
| 5,785,011 A | 7/1998 | Gitterman, III |
| 5,794,571 A | 8/1998 | Goldberg |
| 5,806,087 A | 9/1998 | Grotefend |
| 5,839,394 A | 11/1998 | Dickison |
| 5,842,444 A | 12/1998 | Perrulli |
| 5,913,285 A | 6/1999 | Pritchard |
| 5,915,335 A | 6/1999 | Holt, Jr. |
| 5,950,569 A | 9/1999 | Perrulli |
| 6,000,989 A | 12/1999 | Bacque |
| 6,049,953 A | 4/2000 | McCay et al. |
| D424,761 S | 5/2000 | Mortenson |
| 6,101,979 A | 8/2000 | Wilson et al. |
| D434,535 S | 11/2000 | Koch |
| 6,164,245 A | 12/2000 | Johnson |
| 6,235,713 B1 | 5/2001 | Giedeman, III et al. |
| 6,345,747 B1 | 2/2002 | Ogata et al. |
| 6,427,635 B1 | 8/2002 | Ballard |
| 6,450,129 B1 | 9/2002 | Flynn |
| 6,543,390 B2 | 4/2003 | Lowery |
| 6,564,749 B1 | 5/2003 | Dorsey |
| 6,637,377 B2 | 10/2003 | Lobanoff et al. |
| 6,694,923 B1 * | 2/2004 | Fouche ................. 119/792 |
| 6,932,027 B1 * | 8/2005 | Whitney ................ 119/770 |
| 2003/0150399 A1 | 8/2003 | Lobanoff et al. |
| 2003/0150400 A1 | 8/2003 | Lobanoff et al. |
| 2004/0025804 A1 | 2/2004 | Smith et al. |
| 2004/0112303 A1 | 6/2004 | Moulton, III |

OTHER PUBLICATIONS

Adanac Sleds and Equipment, "Padded Belt", HTTP://www.shopworks.com/adanac/index.cfm/action/product/prodid/000C0A56-413B-1807-952601... Sep. 13, 2004, 1 page.

Chinookwind Outfitters. "Skijoring", HTTP://www.chinookwind.com/abc/showdetl.cfm?&DID=15&CATID20&Product_ID=283&count=... Sep. 13, 2004, 1 page.

Midwest Mountaineering, "Free Spirit Outfitters", HTTP://www.midwestmtn.com/wintersports/skijoring/hipbelt.html. Sep. 13, 2004; 1 page.

"Howling Dog Pet and Mushing Supplies", HTTP://www.howlingdogalaska.com/Supplies.html. Sep. 13, 2004, 13 pages.

Free Spirit Outfitter, "Skijoring Hip Belt w/Pack", HTTP://www.gearfordogs.com/Merchant2/merchant.mvc?Screen=PROD&Product_code=700. Sep. 13, 2004, 1 page.

Fido Gear, "Skijoring", HTTP://www.fidogear.com/store/merchant.ihtml?id=8&step=2. Sep. 13, 2004, 3 pages.

"Ski-Jor Padded Hip Belt", HTTP://www.coldspotfeeds.com/product.asp?idProduct=798&idShopper=70191&id1=24613892&idB ... Sep. 13, 2004, 2 pages.

Chinookwind Outfitters, "SiriusPort Skijorer", HTTP://www.chinookwind.com/acb/showdtl.cfm?&DID=15&Product_ID=195&CATID=20 ... Sep. 13, 2004, 1 page.

"Skijoring", HTTP://www.akkosports.com/english/skijoring_backpacks.htm. Sep. 13, 2004, 3 pages.

"Skijoring Equipment", HTTP://www.nooksackracing.com/skijoring.html. 2 pages.

* cited by examiner

SKIJOR SYSTEM

CROSS REFERENCE TO RELATED APPLICATIONS

This application claims priority to U.S. provisional application Ser. No. 60/517,112 filed Nov. 3, 2003, the contents which are incorporated herein by reference in entirety.

BACKGROUND OF THE INVENTION

1. Field of the Invention

This invention pertains to animal husbandry generally, and more specifically to animal tethering systems useful for skijor and in many other diverse applications.

2. Description of the Related Art

Skijor is a sport where a dog pulls a person on skis over the snow. Most commonly, the person will wear a skijor belt generally about their mid-section that is coupled through a lead to a harness on the dog. Skijor provides excellent winter activity for a dog and person, and so has many participants. Competitions are regularly organized which permit many different dogs and skiers to compete on a trail.

Unfortunately, nearly everyone who has participated in skijor will fall. Depending upon various circumstances, such as but not limited to the size of the skier, the size of the dog, the hazards of the trail and the like, it may be important for a skier to rapidly disconnect from their dog. Yet, when disconnected, many dogs will continue down the trail, pulling whatever lead and couplers remain attached. Where metal fasteners are used to enable this rapid disconnect function, the dog will be pulling a metal component on the end of a fairly long lead. As will be understood, the coupling will bounce about the trail, occasionally picking up velocity substantial enough to injure other participants or spectators. This is clearly not acceptable, yet the skier must be provided with a way to disconnect. Consequently, it is important for a suitable skijor system to address both the needs and safety of the skier and the safety of other participants and spectators.

In addition to a harmless safety release, there are a number of other additional features that have been generally overlooked heretofore in the sport of skijor that would be highly desirable. Among these are the harnessing of a dog for travel to and from a trail and then for skijor. This would heretofore have typically required separate harnesses with the resulting confusion over which harness to use for what application. In addition, the changing of the harnesses required additional time, which added to the overall burden serving to discourage a person and dog from actively participating. Another overlooked feature is the ability to hold back a skijor competitor at the starting gate.

SUMMARY OF THE INVENTION

In a first manifestation, the invention is a skijor system suitable for coupling a skier to a dog, while selectively permitting release of skier from dog in the event of emergency. A harness engages with the dog, and provides a termination. A belt engages with the skier and also provides a termination. A quick release coupled between harness termination and belt termination transmits tension therebetween, and has a first folded strap with a first end and a second end and a fold between, a second folded strap with a second folded strap first end and a second folded strap second end and a fold between, a means to affix first strap first and second ends closer to the second strap fold than a distance between first strap fold and second strap fold, and a release loop coupled to the second strap first and second ends. A flaccid connector couples on a first end to the harness termination and on a second end to the quick release.

In a second manifestation, the invention is a quick release coupling a tension there through and having both an overload force required for a non-destructive release of tension coupling and an emergency manual release of tension coupling. The emergency manual release effects non-destructive release at a force substantially below the overload force. The quick release has a first folded strap with a first end and a second end and a fold between the ends. A second folded strap has a second folded strap first end and a second folded strap second end and a fold between the ends. A means is provided to affix the first strap first and second ends closer to the second strap fold than a distance between first strap fold and second strap fold and to release the first strap from second strap upon the application of an overload force. A release loop coupled to the second strap first and second ends is operative to spread the second strap first and second ends and thereby release first strap from second strap upon the application of an emergency manual release force to the release loop. This release occurs without the application of an overload force between the first and second straps.

In a third manifestation, the invention is a skijor belt for applying a motive force to a skier. A loop defines a circumference about the skier and has a first end and a second end. At least one manually separable fastener couples the loop first end to the loop second end. A strap defines a hand hold, terminating at two separate points on the first loop. An attachment suitable for coupling the loop to a lanyard is generally opposed to the strap about the loop, such that a first tension applied to the strap is offset by a second tension of equal magnitude and opposite direction to the first tension when applied to the attachment.

OBJECTS OF THE INVENTION

Exemplary embodiments of the present invention solve inadequacies of the prior art by providing improved dog harness, skijor belt, and coupling. The combination results in a system which is extremely easy and quick to put into use, and which is very safe for the skier, dog, and any spectators or competitors sharing a trail.

It is the object of the present harness to not chafe or abrade the dog's skin at points of contact. It is a further object of this harness to be quickly and easily deployed upon a dog. It is yet another object of this harness to avoid damaging a dog's throat muscles, windpipe, vocal cords or nerves and to avoid interference with a dog's ability to breath. It is an even further object of this harness to give enhanced control over hard pulling dogs. It is another object of this harness to distribute the pressures generated during operation over a large surface of the harness. It is a further object of this harness to restrain a dog while traveling in a vehicle. It is yet another object to safely restrain the dog in the event of a sudden stop or an accident, to prevent injury to the dog and to others in the vehicle, and to distribute the pressures generated by a sudden stop or an accident over the surface of the harness the dog is wearing. A further object of the invention is to permit sufficient movement to permit the dog to sit, turn around, lie down, and stand while being restrained, all while not undesirably jeopardizing the safety of the animal.

A first object of the quick release is to provide a maximum tension that may be attained before automatic release occurs. A second object of the quick release is to provide a manual release at a tension well below said maximum tension. Another object of the present quick release is to provide a readily activated manual release, while not unduly exposing the quick release to accidental activation. A further object of the quick release is to enable variable placement of the quick release within a lead, cable or the like, and provide manual activation at a location displaced therefrom. Yet another object of the present quick release is to provide substantial control or adjustment of the force magnitude represented by the maximum tension.

A first object of the skijor belt is to provide a coupling between person and lead which is comfortable to wear and which does not interfere with the movements of the person. A second object of the skijor belt is to stay reasonably in position, without significant undesired movement relative to the wearer, when in use. Another object of the present skijor belt is to enable another person to readily grasp the belt and counter any forces being applied on the lead. A further object of the skijor belt is to permit integration with a safety quick release device. Yet another object of the present skijor belt is to permit application beyond skijor, including both similar activities, such as running or roller blading with a dog, and dissimilar activities.

A first object of the inventive skijor system is to provide a completely integrated and operative system which is readily deployed. A second object of the skijor system is to improve the safety of a skier, dog, spectators and other skiers and dogs over the prior art. Another object of the present skijor system is to facilitate transport from one location to another, with minimal set-up. A further object of the invention is to provide the foregoing with components which are readily manufactured without special expense or unusual process. Yet another object of the present invention is to permit substantial flexibility in application to different dogs, persons, and activities.

BRIEF DESCRIPTION OF THE DRAWINGS

The foregoing and other objects, advantages, and novel features of the present invention can be understood and appreciated by reference to the following detailed description of the invention, taken in conjunction with the accompanying drawings, in which.

DESCRIPTION OF THE PREFERRED EMBODIMENT

Figure 1:
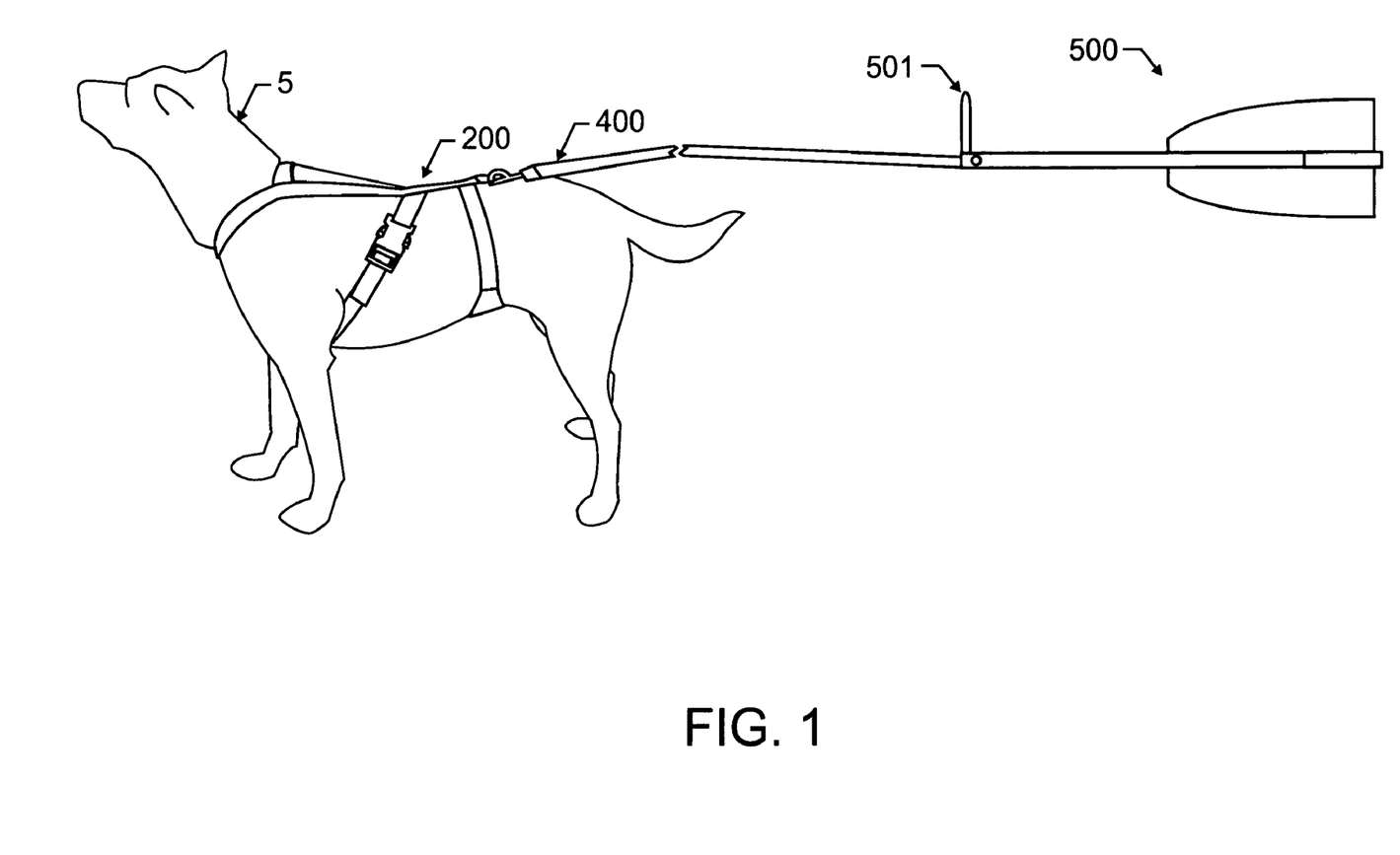
FIG. 1 illustrates a preferred skijor system which includes an animal harness, flaccid lead, quick release coupler and skijor belt designed in accord with the teachings of the present invention from a side view.

Manifested in the preferred embodiment, the present invention provides novel components that operate synergistically to yield a highly beneficial skijor system. FIG. 1 illustrates a preferred skijor system 100, having an optimal harness 200, a safety quick release 501, and an advanced skijor belt 500. As will become apparent herein below, the combined system is deployed through the use of only five removable fasteners, each which are optimally arranged for ease of use. The system begins with added utility prior to even reaching a skijor course, and will have utility during transport of the dog thereto. Each of the individual components are described in greater detail herein below, and through the remaining drawing illustrations.

Figure 2:
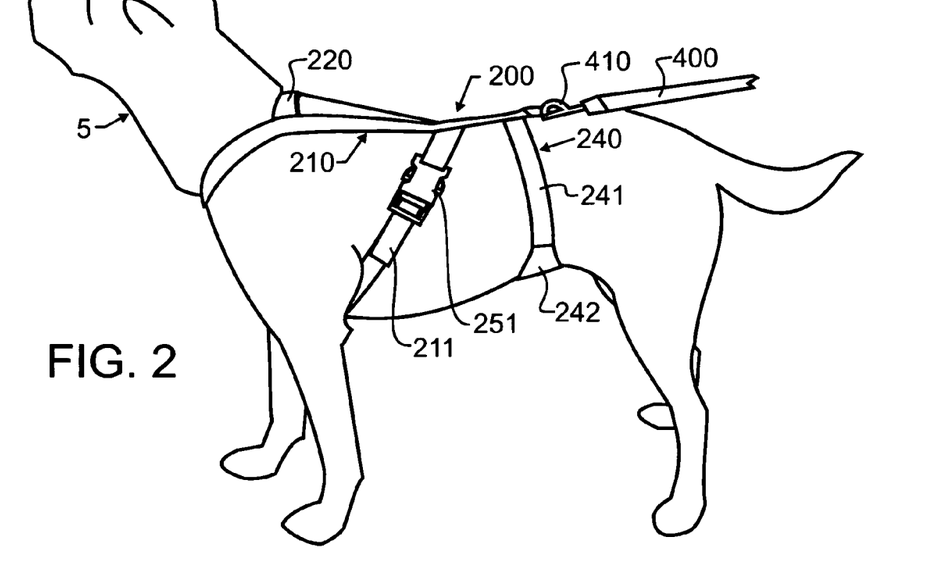
FIG. 2 illustrates a preferred dog harness used in the preferred skijor system of FIG. 1 and designed in accord with the teachings of the present invention from a side view.
Figure 3:
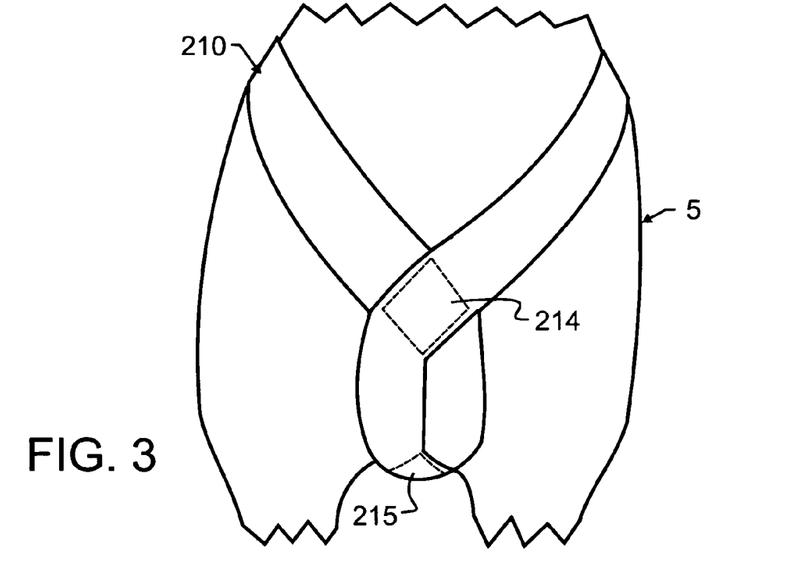
FIG. 3 illustrates the preferred dog harness of FIG. 2 from a front view.
Figure 4:
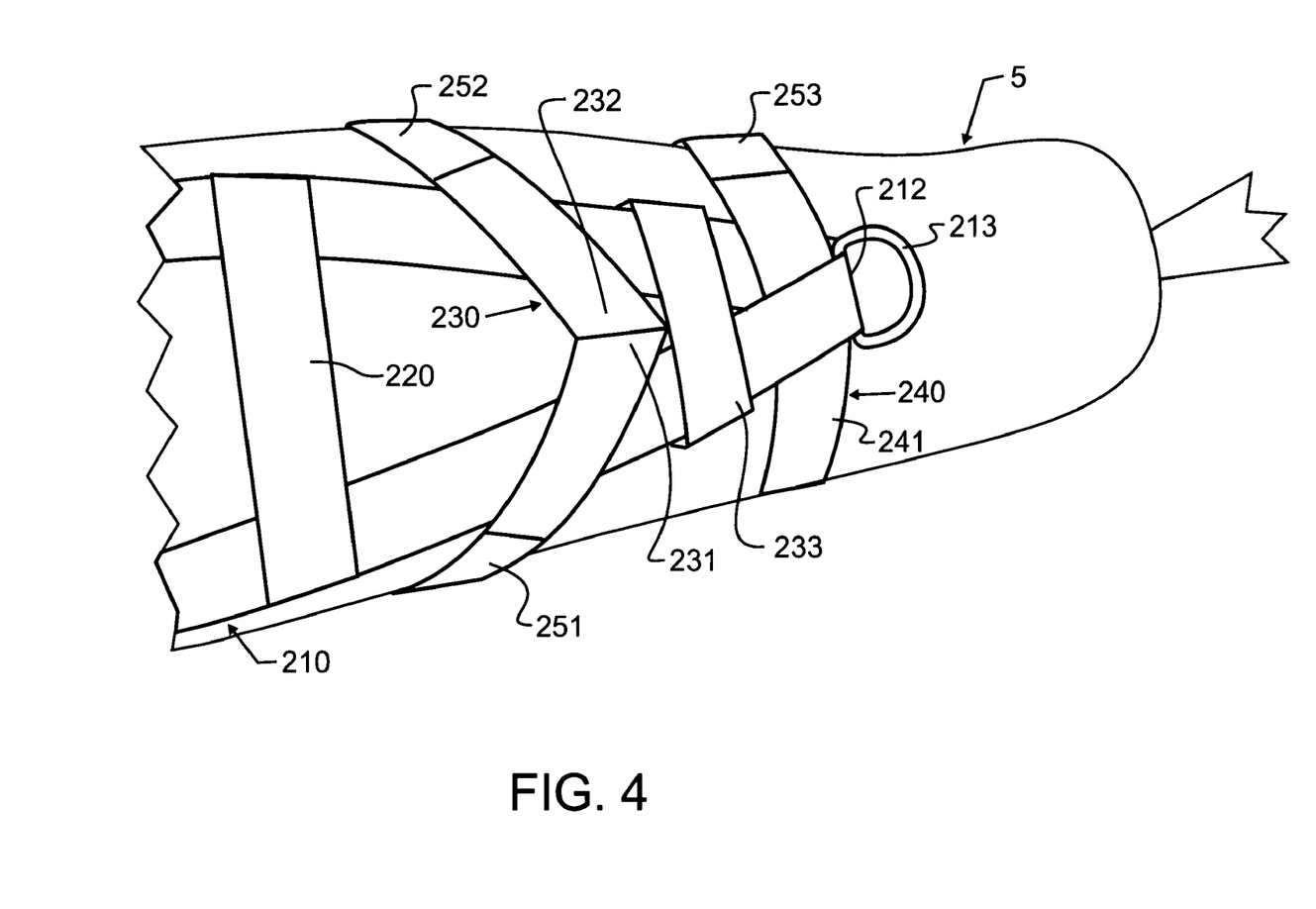
FIG. 4 illustrates the preferred dog harness of FIG. 2 from a top view.

FIGS. 2–4 illustrate a preferred embodiment harness 200, such as may be used on dogs. In the preferred embodiment, harness 200 is made up of four pieces of one-and one half inch wide nylon webbing. The webbing first piece 210 is a long continuous piece folded over in the center 212, visible in FIG. 2. A one-inch D-ring 213 is placed at folded center 212. The specific length of the webbing 210 will be determined, as is known in the art, by the desired size of the harness. Webbing 210 is transversed twice, to form the chest joint 214 and lower neck joint 215 visible in FIG. 3. A short second piece of webbing 220, visible in FIG. 2, is generally at right angles to webbing first piece 210, to define the back portion of the neck opening. The webbing third piece 230 forms the attachment points 251, 252 for the harness at mid-back. This webbing 230 is laid under webbing first piece 210 near center 212, and then crossed over the top at 233 to form an X, with the bottom of the X forming a 45 degree angle. The ends of webbing 230 are at 231 and 232, each which travel to respective buckles 251, 252, where they pass through and loop back to form the aforementioned X, before wrapping over the top at 233. The webbing fourth piece 240 forms the belly strap 241, where, preferably, additional padding 242 is provided. Webbing fourth piece 240 terminates at either end at buckle 253. Most preferably, the entire neck and chest/neck joints are also provided with supplemental padding.

The angles of straps adjacent webbing ends 231, 232, which also reflect the underlying angles, is important to the proper operation of the preferred harness 200. As generally illustrated, these straps are slanted in a forward direction at an approximately 45 degree angle, which allows for a very even pull with no upward movement of the harness under the neck.

Applying the preferred harness 200 to dog 5 is far more convenient and easily accomplished than in the prior art. Using harness 200, the three buckles 251, 252 and 253 will be disconnected. As best illustrated in FIG. 2, in the preferred embodiment, these buckles are, in fact, high quality snaps that are closed simply by sliding the two ends together, and which are opened by manually squeezing the two ears together and then pulling, as is known in the art. Consequently, disconnecting is very fast. Next, the neck portion defined by webbing 210 between chest joint 214 and webbing third piece 220 is passed over the head and about the neck of dog 5. Once again, this is a very simple and quick maneuver. Then the male portions of snaps 251, 252 will be passed under the dog's front legs, and wrapped back up to the respective female snap portions, where they will be inserted and snapped into engagement. While a person will have to reach around the dog's front legs, this too will be a very fast operation. The final step is the wrapping of belly strap 241 about the belly of dog 5, and again the engagement of a snap. Consequently, the dog does not need to step into or out of harness 200 in any way, and the application is very quick and efficient.

Preferred harness 200 is designed for application not only with skijor, but also for dual use as a car harness used to restrain a dog while traveling in a car. Belly webbing 240 is believed to be most consequential for this application. When implemented for dual use, a car coupler 400 will be provided, including a twenty inch section of webbing to attach the dog and harness to the vehicle seatbelt female attachment point. A bull snap 410 or other suitable coupling is sewn or otherwise securely fastened on one end and a male seatbelt end is sewn or otherwise securely fastened on the other end. This seatbelt hardware will snap into the vehicle seatbelt female end. There are other suitable known methods of coupling to existing seat hardware that may be similarly used. The bull snap 410 will attach to D-Ring 213 and will rotate, keeping dog 5 from twisting the lead when turning while restrained.

Figure 5:
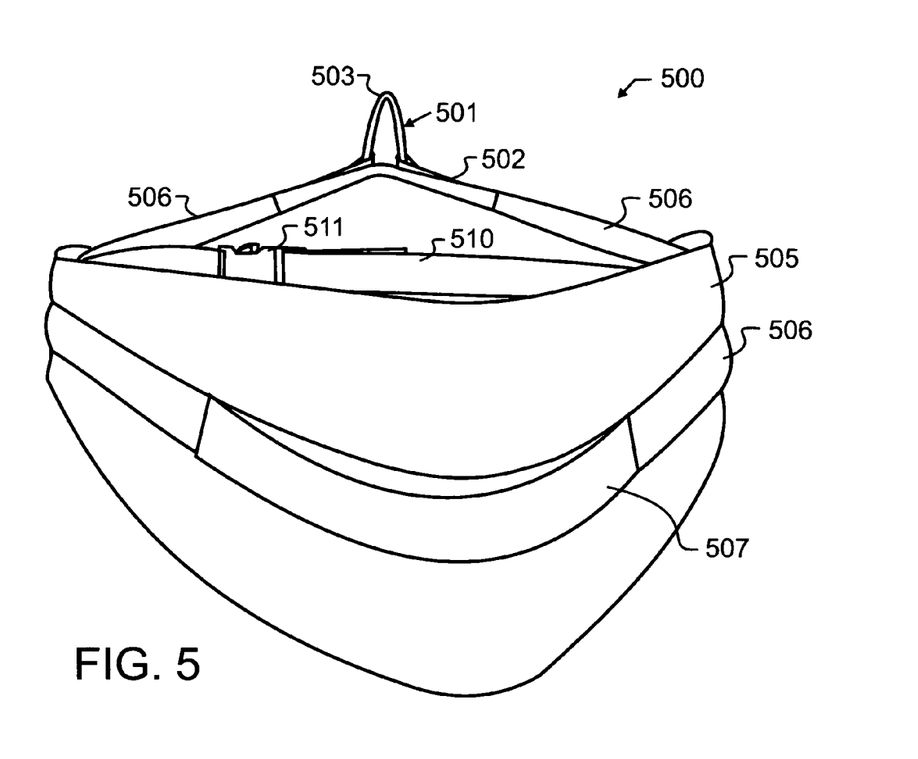
FIG. 5 illustrates a preferred skijor belt used in the preferred skijor system of FIG. 1 and designed in accord with the teachings of the present invention from a slightly projected rear view.
Figure 6:
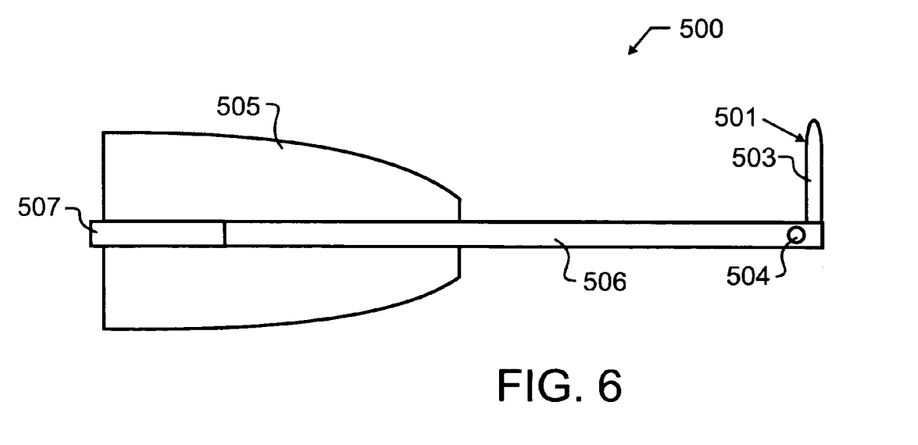
FIG. 6 illustrates the preferred skijor belt of FIG. 5 from a side view.

FIGS. 5 and 6 illustrate the preferred embodiment competition skijor belt 500, with quick release 501 formed integrally therewith. This belt 500 has a unique back support 505 which cups and supports a skier's lower back. A unique inner liner material most preferably comprises Tough-Tek which is a sticky, skid resistant material that resists slip. Inner liner prevents belt 500 from sliding up on the skier, such as when the skier is tucked while going down hills. An elastic waist band 510 holds skijor belt 500 securely against the skier's body, and also helps prevent belt 500 from slipping.

Pulling tension is primarily transmitted through strap 506, which wraps around the outside of back support 505, and extends forward to quick release 501. Quick release system 501 is most preferably formed integrally into the ends of strap 506, which enables the skier to separate himself from the dogs in the event of a serious fall. Quick release system 501 includes a short strap 502 which is most preferably laminated with hooks from standard hook and loop fasteners on one face. Strap 506 has loops from standard hook and loop fasteners laminated on an inner face therewith. Consequently, if a force of magnitude greater than the shear strength of the particular hook and loop combination used is encountered, then short strap 502 will simply shear from strap 506, thereby protecting a skier from extreme forces. In addition, loop 503 is provided which may readily be grasped by the skier. Simply pulling loop 503 closer to buckle 511 will cause the hook and loop fasteners to peel apart, which will also then release short strap 502. It should be apparent that the specific attachment arrangement of hooks and loops is not critical to the invention. Further, other means of attachment may be provided, either separately or in combination, such as the snap 504 illustrated in FIG. 6.

The Skijor belt 500 materials in the preferred embodiment consist of an outer shell of ballistic nylon, a core material of neoprene foam, and the inner liner described above, the combination which helps keep belt 500 from moving up the back of the skier when skiing. These materials are shaped to form, for exemplary purposes only, a 10 inch wide (at the widest point) supportive belt. This belt is shaped to give the greatest amount of back support while not hindering the skier's movement. A 1½ inch wide section of webbing 60 inches long is sewn across the back of skijor belt 500, to form strap 506. It is placed one inch down from the top of the belt. This length of webbing will terminate on each side of quick release system 501.

For exemplary purposes only, and not limiting thereto, the preferred embodiment quick release 501 is built into the ends of the 1½ inch webbing comprising strap 506. The 1½ inch webbing is extended 18 inches on each side from back support 5.05. 8 inches of 1½ inch Velcro brand loop is sewn onto the webbing, ½ inches back from the end of the segment of webbing on each side. The lengths of webbing are sewn together 1½ inches behind the loop which is sewn into place. Eight inches of rope or bungy cord is sewn into the ends of the 1½ inch webbing at right angles to the webbing. This forms vertical loop 503. The second part of the quick release comprises 22 inches of 1½ inch webbing, with 8 inches of hook on each side, and snaps as appropriate, to form short strap 502.

Figure 7:
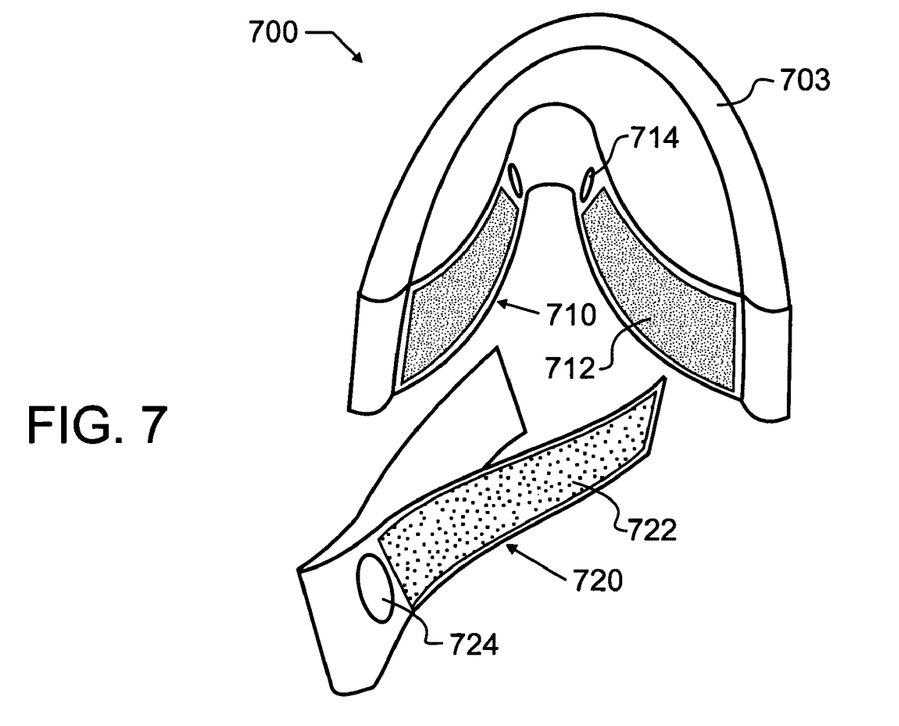
FIG. 7 illustrates an independent quick release designed in accord with the teachings of the present invention, showing each component disassembled.
Figure 8:
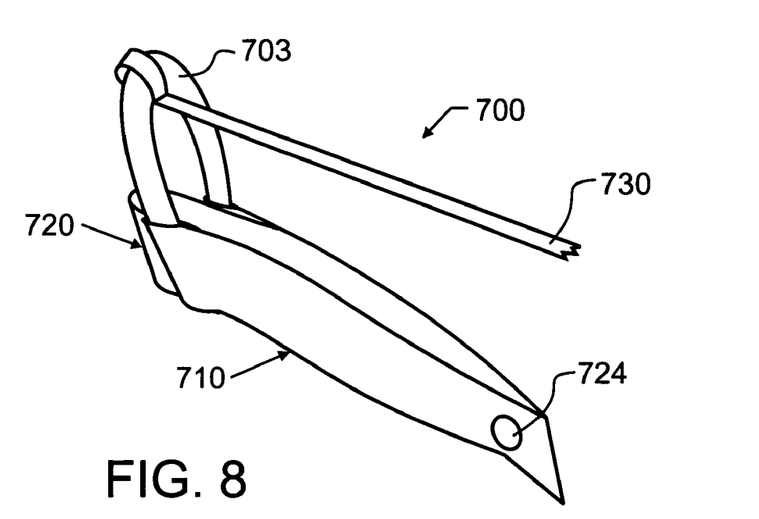
FIG. 8 illustrates the independent quick release of FIG. 7, in further combination with a remote actuation lanyard for activating the manual release.

FIGS. 7 and 8 illustrate an independent quick release 700 designed in accord with the teachings of the present invention, showing each component disassembled. Quick release 700 is preferably designed for use in situations where an operator needs an emergency device to release the operator from another device. One such application for which this device is designed is for Skijoring, while another suitable application is Bikejoring. However, this device may be applicable in many other diverse areas too numerous to specifically describe herein. Among these are military, medical, sporting and consumer applications. As but one example, traction systems including slings and other such apparatus will frequently have a need to protect a patient against excessive forces, but with desired rapid release. Quick release 700 fulfills this need perfectly. As shown in these figures, the components are similar to those already described herein above with reference to quick release 501. However, two additional concepts are illustrated herein. First, two straps 710, 720 may be used, and both be folded to form a fold approximately midway between ends. To provide attachment surface area in the form of loops 712 and hooks 722, these two straps 710, 720 are then nestled together, yielding the assembled quick release shown in FIG. 8. Snaps 714 and 724 provide a convenient way to ensure that neither section of the quick release will become lost or slip off of the cord or cable to which they are attached subsequent to a release.

FIG. 8 illustrates the independent quick release of FIG. 7, in further combination with a remote actuation lanyard for activating manual release loop 703. This lanyard 730 may be provided for activation at great distance. Alternatively, lanyard 730 may be attached, for exemplary purposes, to a person, such as on a biker's wrist, in which case the lanyard will automatically initiate and will cause a release if the biker falls.

While the folded straps 710, 720 are preferred as offering much flexibility for application, it is also noteworthy to observe that a single strip may be used instead of the folded strap 720 illustrated herein. In other words, with a single, unfolded strap having hooks 722 on both faces, it will engage with both loop surfaces 712 on folded strap 710. In turn, some type of fastener will be required at the end of this single unfolded strap, to permit attachment to some other device, since the strap cannot simply be folded around the other device.

While the foregoing details what is felt to be the preferred embodiment of the invention, no material limitations to the scope of the claimed invention are intended. Further, features and design alternatives that would be obvious to one of ordinary skill in the art are considered to be incorporated herein. Among these are changes in size, dimension, or proportion necessary to accommodate different body sizes and shapes. The present major components, including harness 200, skijor belt 500, and quick release 501 form a complete skijor system. However, it will be apparent to those skilled in the art upon a review of the present disclosure that each individual component will have separate utility, potentially in very diverse fields. For exemplary purposes only, and not limited thereto, skijor belt 500 may have utility in any activity requiring a tension be coupled to a person's body, including but not limited to other types of skiing, other sporting activities, and even non-sporting work and therapy systems. Likewise, the preferred harness may be used for any suitable activities, bikejor, skijor, walking, and driving being just examples thereof, and will be readily adapted not only to different sized dogs, but to other animals of similar build as well. Finally, the quick release may be used in any tension applications that require a fail-safe to prevent excessive tension transmission or manual termination of applied forces. Consequently, the scope of the invention is set forth and particularly described in the claims hereinbelow.

We claim:

1. A skijor system suitable for coupling a skier to a dog, while selectively permitting release of said coupling in the event of emergency, comprising:
    a harness adapted to engage said dog, and providing a termination;
    a belt adapted to engage said skier and providing a termination;
    a quick release coupled between said harness termination and said belt termination transmitting tension therebetween and having a first folded strap with a first end and a second end and having a fold between said first and second ends, a second folded strap with a second folded strap first end and a second folded strap second end and having a fold between said second folded strap first and second ends, means to affix said first strap first and second ends closer to said second strap fold than a distance between said first strap fold and said second strap fold, and a release loop coupled to said second strap first and second ends; and
    a flaccid connector coupled between said harness termination and said belt termination transmitting tension therebetween.

2. The skijor system of claim 1 wherein said belt further comprises:
    a loop adapted to define a circumference about said skier and having a first end and a second end;
    at least one manually separable fastener coupling said loop first end to said loop second end;
    a strap defining a hand hold, said strap terminating at two separate points on said first loop; and
    an attachment suitable for coupling said loop to a lanyard, said attachment generally opposed to said strap about said loop such that a first tension applied to said strap is offset by a second tension of equal magnitude and opposite direction to said first tension when applied to said attachment.

3. The skijor system of claim 2, further comprising a pad adapted to couple between said loop and said skier.

4. The skijor system of claim 3, further comprising a non-slip material adapted to be between said pad and said skier, and adapted to be in contact with said skier.

5. The skijor system of claim 2, wherein said loop further comprises strapping extending entirely through said circumference, and said strap extends farther than said strapping between said two separate points.

6. The skijor system of claim 2, wherein said strap is co-planar with a plane generally defined by said loop.

7. The skijor system of claim 1 wherein said first folded strap fold is equidistant from said first folded strap first end and said first folded strap second end, said second folded strap fold is equidistant from said second folded strap first end and said second folded strap second end, said first folded strap and said second folded strap overlapping substantially between said first folded strap fold and said second folded strap fold.

8. The skijor system of claim 1 wherein said means to affix further comprises at least one hook and loop fastener.

9. The skijor system of claim 8 wherein said means to affix further comprises at least one snap.

10. A quick release coupling a tension there through and having both an overload force required for a non-destructive release of said tension coupling and an emergency manual release of said tension coupling, said emergency manual release which effects said non-destructive release at a force substantially below said overload force, comprising:
    a first folded strap with a first end and a second end and having a fold between said first and second ends;
    a second folded strap with a second folded strap first end and a second folded strap second end and having a fold between said second folded strap first and second ends;
    means to affix said first strap first and second ends closer to said second strap fold than a distance between said first strap fold and said second strap fold and to release said first strap from said second strap upon the application of an overload force; and
    a release loop coupled to said second strap first and second ends and operative to spread said second strap first and second ends and thereby release said first strap from said second strap upon the application of an emergency manual release force to said release loop, said release occurring without the application of said overload force between said first and second straps.

11. The quick release of claim 10 wherein said first folded strap fold is equidistant from said first folded strap first end and said first folded strap second end, said second folded strap fold is equidistant from said second folded strap first end and said second folded strap second end, said first folded strap and said second folded strap overlapping substantially between said first folded strap fold and said second folded strap fold.

12. The quick release of claim 10 wherein said means to affix further comprises at least one hook and loop fastener.

13. The quick release of claim 12 wherein said means to affix further comprises at least one snap.

* * * * *